Sept. 20, 1971    M. L. POLANYI ET AL    3,606,539
APPARATUS AND METHOD FOR MEASURING OSMOTIC
FRAGILITY OF RED BLOOD CELLS
Filed Nov. 13, 1968    3 Sheets-Sheet 1
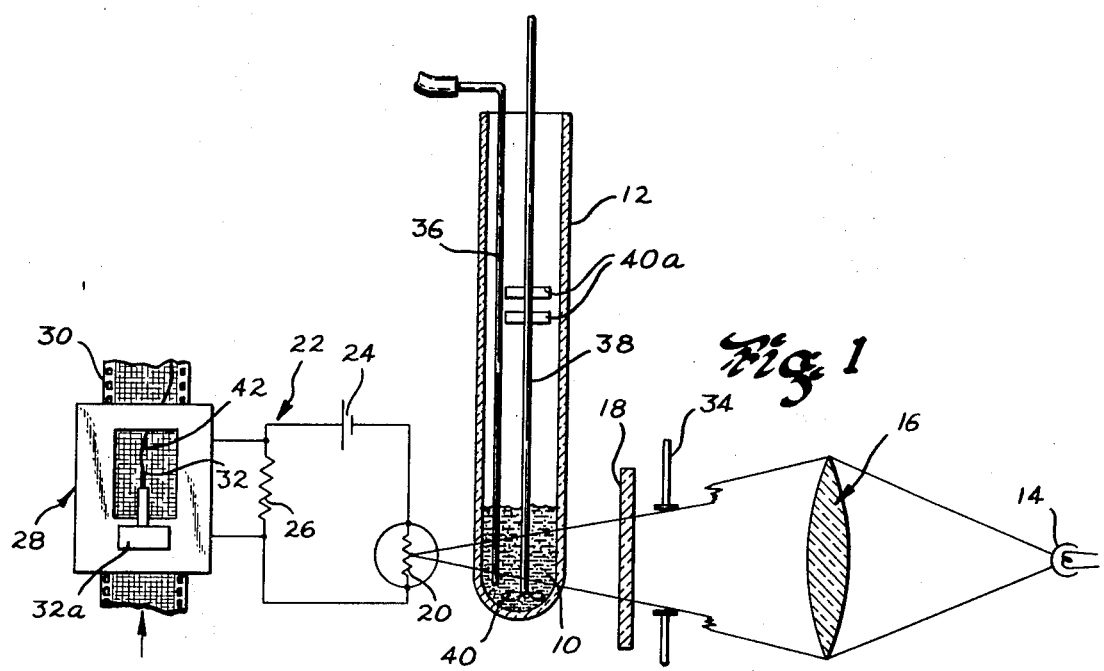
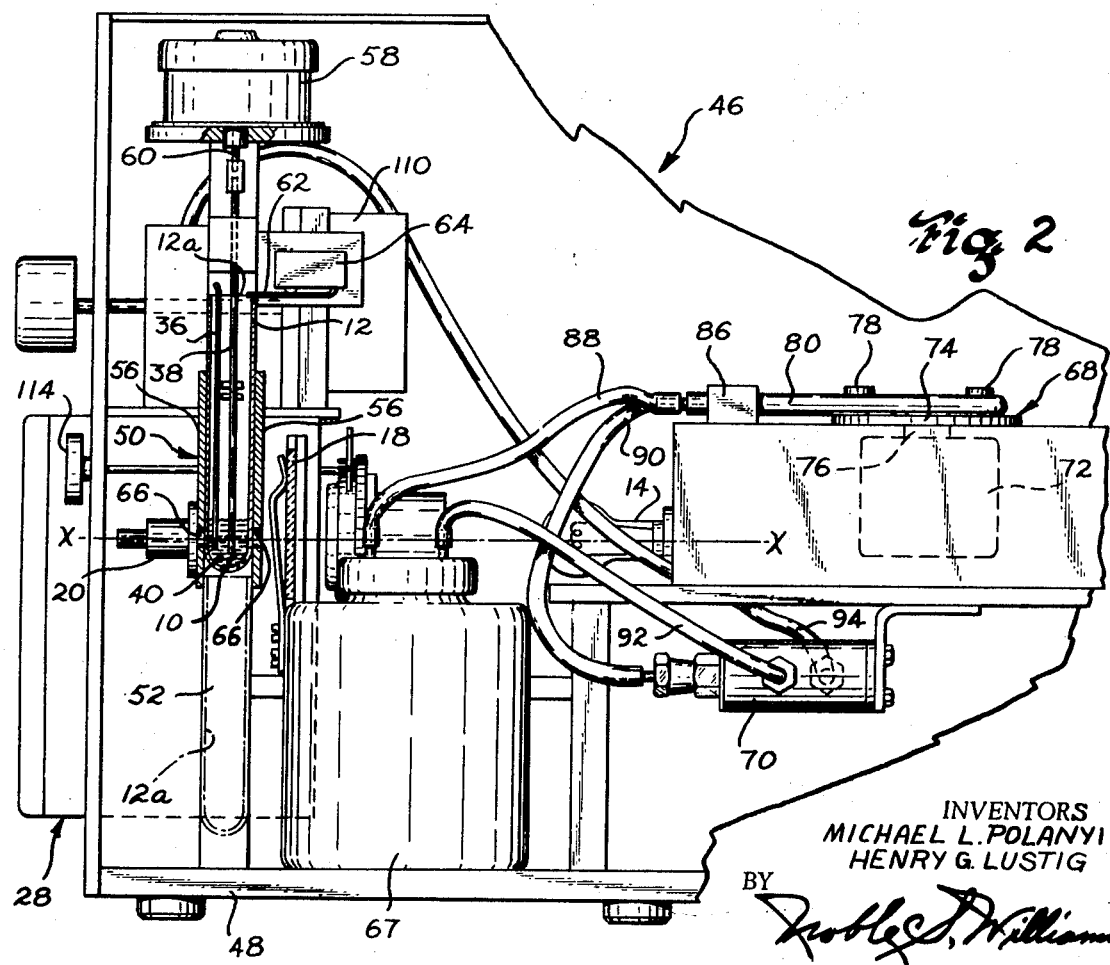
INVENTORS
MICHAEL L. POLANYI
HENRY G. LUSTIG
BY
ATTORNEY

INVENTOR.
MICHAEL L. POLANYI
HENRY G. LUSTIG

ATTORNEY

INVENTOR.
MICHAEL L. POLANYI
HENRY G. LUSTIG

ATTORNEY

United States Patent Office 3,606,539
Patented Sept. 20, 1971

3,606,539
APPARATUS AND METHOD FOR MEASURING OSMOTIC FRAGILITY OF RED BLOOD CELLS
Michael L. Polanyi, Webster, Mass., and Henry Lustig, Poughkeepsie, N.Y., assignors to American Optical Corporation, Southbridge, Mass.
Filed Nov. 13, 1968, Ser. No. 775,465
Int. Cl. G01n 21/06, 21/26, 33/16
U.S. Cl. 356—39                                                             9 Claims

ABSTRACT OF THE DISCLOSURE

Measuring osmotic fragility of erythrocytes for diagnosis of blood dyscrasias. A blood sample, diluted in an isotonic saline solution, is placed in a test tube which in turn, is positioned in apparatus for measuring osmotic fragility of erythrocytes in the sample. In the apparatus, distilled water is delivered directly into the sample at a predetermined constant rate with continuous mixing to maintain equilibrium of tonicity throughout the sample. The sample is transilluminated during such dilution and light transmittance through the sample is photoelectrically measured and recorded to indicate the rate and percent of hemolysis versus time or tonicity. Tonicities of the sample at which hemolysis starts, ends and/or reaches other values are determined from the recording for interpretation of erythrocytic osmotic fragility.

BACKGROUND OF THE INVENTION

Field of the invention

The testing and study of cell and microorganism membrane fragility with particular reference to improvements in apparatus and method for measuring the osmotic fragility of erythrocytes.

Description of the prior art

Osmotic fragility tests are intended to give information on the resistance of cell or microorganism membranes to internal pressure usually developed by water.

Erythrocytes (red blood cells) in a liquid suspension medium of lower than isotonic salt concentration absorb the low tonicity liquid by osmosis through the cell membrane. At some osmotic gradient determined by the tonicity of the suspension medium, sufficient pressure is developed within the cells to either burst their membranes or to open numerous pores therein which release hemoglobin into the surrounding medium. This action is commonly referred to as hemolysis. It is a function of the condition of the cell membrane and of the salt concentration (tonicity of the cell suspension medium), both of which are variable. The former can be determined through control of the latter.

Hemolysis is induced by rendering the suspension medium hypotonic and with knowledge of the condition (concentration of salt) of the suspension medium that is required to induce or start hemolysis and that required to complete hemolysis, an indication of the condition of the cell membrane is given. This, in turn, can be interpreted in terms of the health of the host.

The classical osmotic fragility test employs a series of test tubes into each of which is placed the same amount of blood cells and volume of salt solution but with the salt concentration being progressively lower in the series of tubes. After standing for some time, unhemolysed blood cells in each of the test tubes are centrifuged and comparisons between the original amounts of blood cells and the sedimentation, taken as a function of respective concentrations of the salt solutions in the tubes, are plotted graphically for analysis of conditions of the blood.

Because of the numerous operations involved, the ever-present chance of human error in measuring and preparing test tube samples and the requirement for exceptional skill and judgment on the part of the analyst along with the aggravation of long waits between initial blood sampling and the receipt of test results, the foregoing test leaves much to be desired. Its lengthiness is impractical for routine clinical use or for use during surgery and information offered thereby is seriously limited.

More recently, it has become possible to test the osmotic fragility of blood cells more rapidly and with greater ease and accuracy. This has been accomplished by the introduction of a system requiring only one sample. The sample is a suspension of blood cells in an isotonic solution placed in a dialyzing container which, in turn, is placed in a hypotonic solution. The concentration of salts in the blood cell suspension medium is gradually decreased by osmotic action through the dialyzing container thereby causing a corresponding increase in osmotic pressure within the blood cells and eventual hemolysis. A hemolysis curve is produced by measuring light transmittance through the dialyzing container.

The hemolysis curve resulting from this system is a measure of light transmittance in function of time which can be interpreted in terms of the rate of hemolysis and has the advantage of producing relatively rapid indications of blood cell osmotic fragility.

Uncertainties and limitations as to the exact tonicity of the blood cell suspension medium at any given instant or degree of hemolysis are, however, a drawback to the dialysis system. Accurate correlation between time and tonicity or tonicity and the degree or amount of hemolysis is not only desirable but is a highly significant factor in determining the nature and extent of blood dyscrasias.

Furthermore, the dialysis system is encumbered by the requirement for specially designed test cells having dialysis windows wherein the dialysis material must be selected to suit the particular hypotonic and isotonic solutions employed in the test so that a rate of diffusion which is suitable for the test will take place. The test cells, accordingly, are not universally adaptable to testing with different types of solutions or solutions of different values of salt concentration. They are difficult to clean for reuse, expensive to replace and stock in all quantities, sizes and types that may be required and, in short, merely add to the already burdensome cost and complexity of hospital laboratories, operating rooms and/or other such facilities.

The present inventive concept overcomes the aforementioned and other problems or drawbacks of prior art techniques, systems and equipment in the field of osmotic fragility testing of red blood cells with corollary features of its being adaptable to the study of effects of varied types and concentrations of drugs on osmotic red cell fragility as well as studies of osmotic fragility of other types, shapes and sizes of cells or microorganisms.

SUMMARY OF THE INVENTION

In accordance with principles of this invention, osmotic fragility testing is performed with only one sample placed in a standard laboratory test tube. In the case of testing for erythrocytic osmotic fragility, the sample is a small amount of heparinized whole blood diluted in an isotonic saline.

The sample is transilluminated and distilled water is delivered directly thereinto at a predetermined constant rate with continuous mixing so as to maintain an equilibrium of tonicity throughout the sample during the entire test. Light transmittance through the sample is photoelectrically measured and recorded preferably in the form of a sigmoid curve from which a measure of the rate and percent of hemolysis versus time or tonicity of the blood cell suspension medium may be determined. The sigmoid curve will be referred to hereinafter as a hemolysis curve.

In addition to the test tube, apparatus of the invention includes an instrument having a testing station wherein the test tube containing a sample to be tested is positioned. The sample is transilluminated by light projecting and filtering means positioned adjacent one side of the station. Photoresistive means in the path of illumination at an opposite side of the station receives light transmitted through the specimen and appropriate electrical circuitry delivers to a recorder a signal which corresponds in amplitude to the amount of light received by the photoresistive means.

The recorded signal is a function of hemolysis versus time wherein the latter may be interpreted in terms of tonicity of the cell suspension medium which, in turn, indicates a measure of the osmotic fragility of cells in the sample.

An iris diaphragm located between the test tube station and the light source may be provided for standardizing the test to take into consideraion individual differences in blood cell volume and a wide range in hematocrit. Compensation for the increase in light transmission through the sample due to dilution is performed electrically and a red filter in the light projection system minimizes the effect that released hemoglobin may have upon light reaching the photosensitive means.

The present invention will be more fully understood by reference to the following description and the accompanying drawings.

DESCRIPTION OF THE DRAWINGS

FIG. 1 is a schematic illustration of principles of the present inventive concept;

FIG. 2 is a fragmentary partially cross-sectioned illustration of an apparatus embodiment of the invention;

DESCRIPTION OF THE PREFERRED EMBODIMENTS

Figure 3:
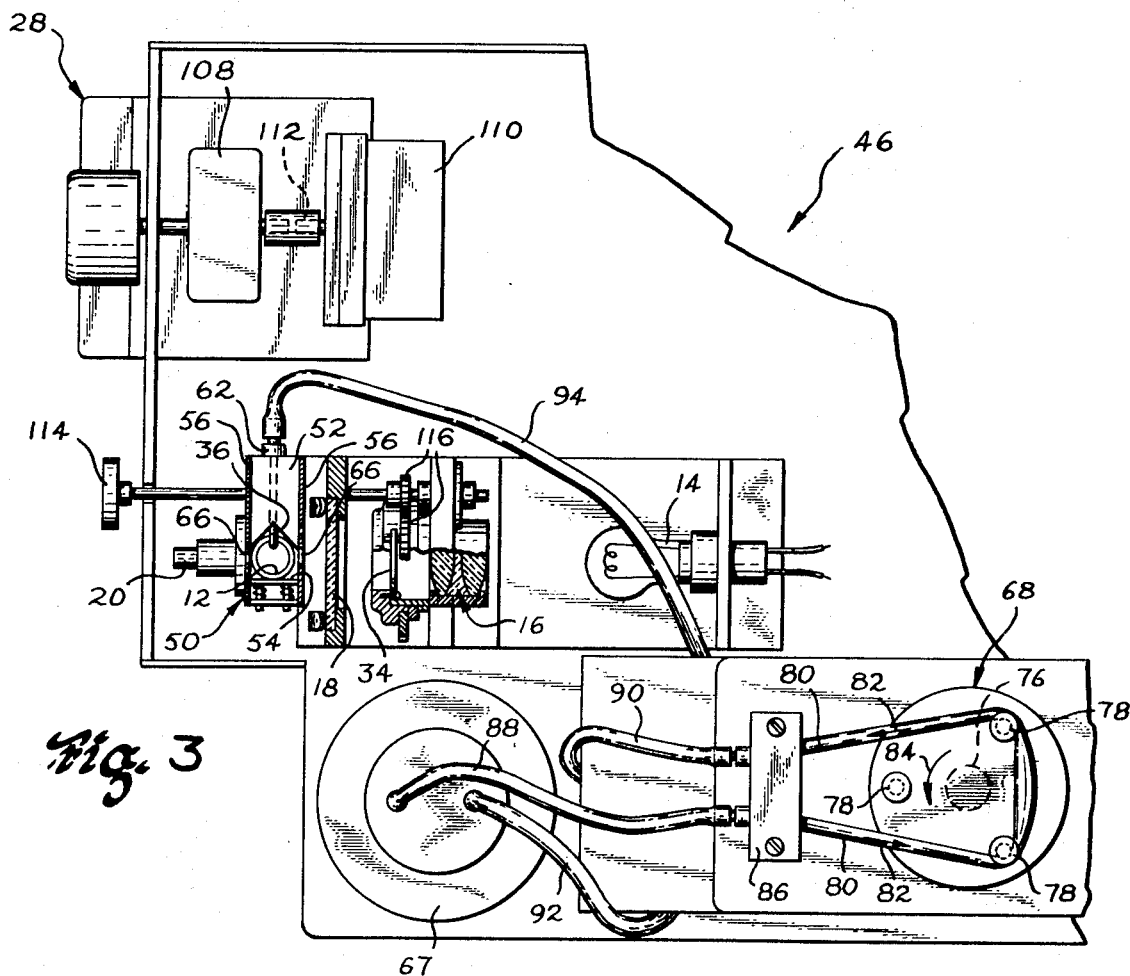
FIG. 3 is a similarly fragmentary and partially cross-sectioned plan view of the apparatus.

Principles of the present invention are schematically illustrated in FIG. 1. FIGS. 2–5 illustrate details of a working embodiment of apparatus of the invention.

Referring more particularly to FIG. 1, it can be seen that the testing of cell membrane fragility is performed with a single specimen or test sample 10 placed in a standard laboratory test tube 12.

In the case of testing blood cell fragility, a cuvette, e.g. a 15 ml. test tube 12, containing a sample 10 consisting of .1 ml. of heparinized whole blood diluted in 1.5 ml. of isotonic saline may be used.

Sample 10 is transilluminated by projecting light from lamp 14 with objective lens means 16 through red filter 18 and test tube 12 onto a photoresistor 20 in measuring system 22.

Photoresistor 20 is placed in electrical circuit with a source of current 24 and recorder input resistor 26 across which recorder 28 is electrically connected.

Recorder 28 is convenional and, accordingly, details thereof are not shown herein since such details form no pertinent part of the present inventive concept. For purposes of this invention, a useful recorder would be one operating with a roll or strip of graph paper 30 driven at a predetermined constant linear speed (e.g. one inch per minute) across which a tracing pen 32 is moved from a given position on one side of the paper toward its opposite side by amounts corresponding to variations in amplitude of a signal applied to the pen drive mechanism 32a. In this case, the tracing pen drive mechanism is controlled by electrical current developed across resistor 26, changes in the amplitude of which are determined by the variable resistance of photoresistor 20 as it is affected by varying intensities of light impinging thereupon.

Various forms of commercially available recorders of the aforesaid general type and others capable of electromechanically producing or electronically displaying, in graphic form, the characteristics of a signal current may be applied to the present measuring system and this invention is not intended to be limited to any one type or form thereof.

Measuring system 22 is calibrated with an adjustable (e.g. iris) diaphragm 34 for standardization of the amount of light transmitted through the test sample prior to performance of the test. This accommodates for differences in cell volume which may be encountered in the testing of different samples.

The cell fragility test is performed by adding distilled water or other diluting liquids, the effect of which on hemolysis is to be investigated, to sample 10. Delivery tube 36 is used for this purpose and the diluting liquid is dispensed therethrough at a predetermined constant rate (e.g. 1 cc./minute) over a given period of time (e.g. 9 minutes) whereby a direct correlation between "time" and "dilution" is obtained. Thus, the dilution at any particular time can be obtained as a function of time tiself measured from the beginning of the run of the test.

Delivery of the diluting liquid is made deep in the test sample, i.e. near the bottom of tube 12, with continuous mixing being effected by stirrer 38. The diluting liquid is dispensed in close proximity to paddle 40 of stirrer 38 to provide equilibration of the tonicity throughout sample 10 before the cells therein have time to hemolyze due to local low tonicity at the site where the diluting liquid is added. Paddles 40a assist in the stirring when the dilution reaches their level and above in test tube 12. No mechanical hemolysis is produced by the stirring.

As the concentration of salt in the blood cell saline suspension medium is decreased from isotonicity by dilution, the cells gradually absorb the lower tonicity liquid by osmosis to a point where sufficient pressure is developed within particular cells to open numerous pores therein or burst their membranes whereby, in either case, their hemoglobin is released into the sample suspension medium. As the run of the test (dilution) is continued, increasing numbers of the cells release their hemoglobin. The concentration of hemoglobin in the suspension medium and that within the ruptured cell membranes eventually becomes substantially the same. Thus, the ruptured cell membranes become ghost-like and have no appreciable affect upon light transmitted through the sample suspension medium.

The amount of light transmitted through sample 10 at any one time during the test run, with red filter 18 minimizing the effect of hemoglobin diffusing in the diluted cell suspension medium, corresponds to the amount of hemolysis that has taken place at that time.

Considered another way, the amount of transmitted light corresponds to the amount of unhemolyzed blood cells remaining in the suspension. Unhemolyzed cells in the suspension diffuse and absorb incident light and thereby reduce the transmission of light through the sample. Thus, as hemolysis increases, the amount of light transmitted through the sample increases.

With dilution of the sample taking place at a known constant rate, as already mentioned, factors of time, dilution, the amount of transmitted light and, accordingly, percent hemolysis are correlated.

With recorder paper 30 moving in the direction of arrow 30a, for example, at a known rate (e.g. 1 inch per minute) during the test run and photoresistor 20 producing an electrical signal across the recorder input resistor 26 of an amplitude corresponding to the amplitude of light received by photoresistor 20, tracing pen 32 produces hemolysis curve 42. Curve 42 represents the rate and percent of hemolysis taking place in sample 10 versus time with time being directly related to tonicity of the blood cell suspension medium by virtue of dilution of the sample taking place at a predetermined constant rate (e.g. 1 cc. per minute).

Figure 4:
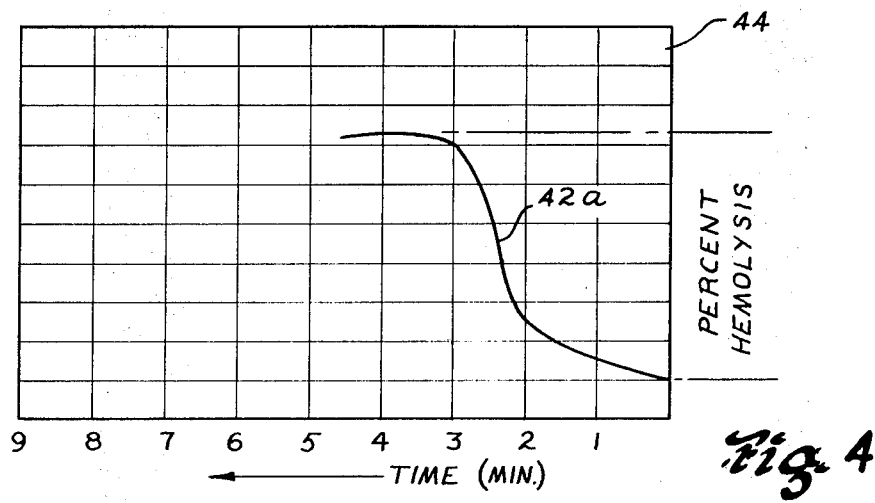
FIGS. 4, 5 and 6 are exemplary hemolysis curves which may be produced according to principles of the invention.
Figure 5:
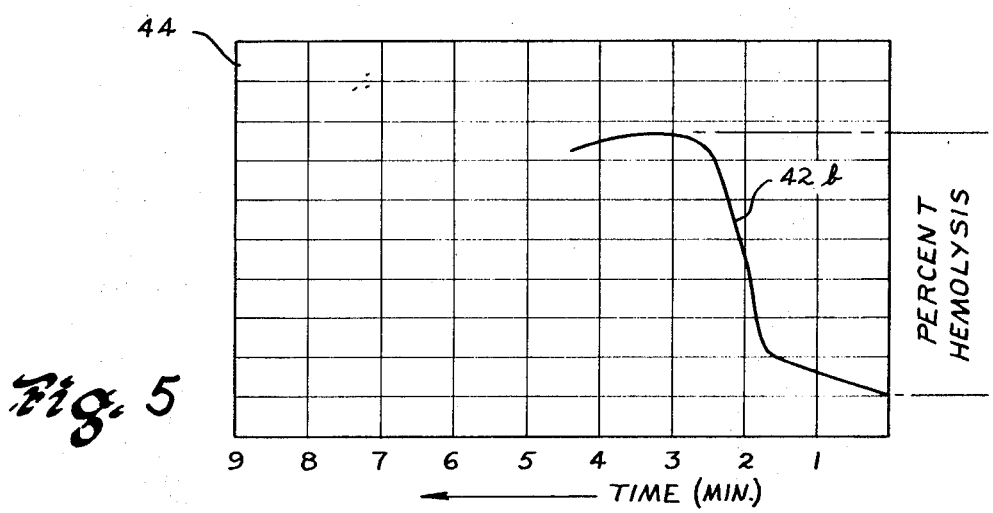
Figure 6:
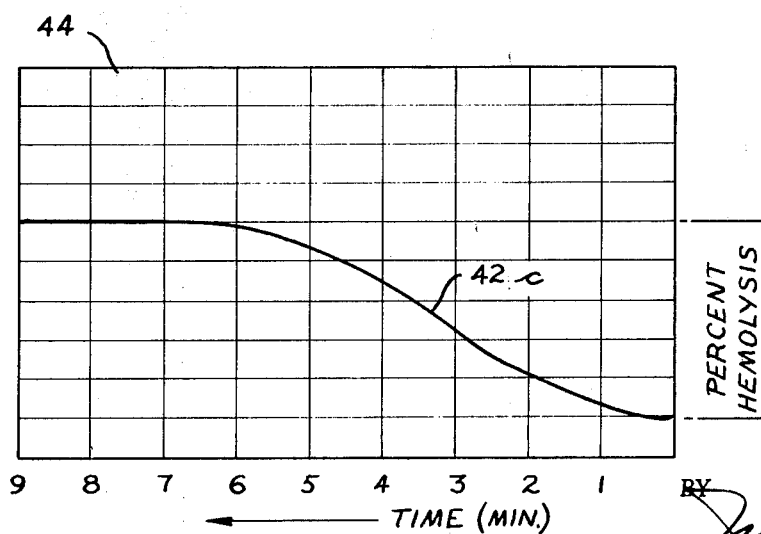

Exemplary hemolysis curves are shown in FIGS. 4, 5, and 6 wherein hemolysis is represented as beginning at the right edge of each chart 44 and reaching a maximum in each case. The maximum represents the point, with time (tonicity of the sample), at which complete hemolysis has taken place.

Interpretation of the hemolysis curve is accomplished by translating time into salt concentration (tonicity) of the test sample and ordinates of the recorder tracing into percent hemolysis. Percent hemolysis and tonicity at preselected points on each curve may be used for detailed analysis of fragility of the blood cells in diagnosing blood dyscrasias.

Hemolysis curve 42a, FIG. 4, is representative of one produced by the aforesaid testing of blood from normal healthy adults.

For purposes of comparison, curves produced by the testing of abnormal blood are shown in FIGS. 5 and 6 as curves 42b and 42c respectively. Curve 42b is representative of a case of thalassemia and curve 42c is representative of a case of spherocytosis. It may be interesting to note that it can be seen from these curves that erythrocytes from thalassemia patients have a greater resistance to hemolysis than do cells from spherocytic patients while the latter have greater osmotic fragility than the former.

Detailed analysis of special parts of the hemolysis curves can be studied further by using different values of salt concentration in the blood suspension medium of a sample and adding solutions of suitable tonicity, instead of water, at a wide range of rates. The test may be used to study the effects of varying types and/or concentrations of drugs on osmotic red cell fragility by placing the drugs in the initial sample or by their inclusion in the diluting medium. Acids or alkali may also be used to cause hemolysis by acidity, alkalinity or lysins.

DETAILS OF APPARATUS

Referring more particularly to FIGS. 2–5, instrument 46 has base 48 upon which there is supported, by suitable framework and bracketing, various apparatus components of the instrument which include the following:

A specimen testing station 50 (FIGS. 2 and 3) receives test tube 12. Therein, a side of the test tube is placed firmly against vertically disposed V-block 52 and moved upwardly approximately from a position indicated by dot-dash outline 12a to the position illustrated by the full line illustration of the tube (FIG. 2).

In the latter position, test tube 12 is frictionally held in place by a spring tensioned holding plate 54 (FIG. 3) or the equivalent in a chamber defined by the V-block channel and a pair of spaced plates 56 extending from the block.

Fixed to the uppermost end of block 52 is electric motor 58 (FIG. 2) having stirrer 38 coupled to its drive shaft 60 and extended longitudinally into the test tube receiving chamber so as to be received by test tube 12 substantially as illustrated in FIGS. 1 and 2.

Adjacent stirrer 38 is fluid delivery tube 36 having its upper end fixed to block 52. In this embodiment of the invention, tube 36 is of an inverted L-shape having its shorter leg extended through block 52 to a supply fitting 62 (FIG. 3).

When test tube 12 is moved upwardly into testing station 50 it automatically receives stirrer 38 and fluid delivery tube 36. The upper end 12a of tube 12 engages a stop when sample 10 is in a preselected position for testing.

The stop in this embodiment of the invention is lever 62 of microswitch 64 which, when engaged by end 12a of the test tube, closes switch 64 and readies the electrical system of the instrument for testing of the sample in a manner to be described in detail shortly.

With test tube 12 at the aforesaid sample testing position, its end containing sample 10 is positioned adjacent openings 66 through plates 56 (FIG. 2) on optical axis x—x of the above-mentioned optical system which includes lamp 14, objective lens means 16, iris diaphragm 34 and red filter 18.

Photoresistive element 20 receives light projected along axis x—x through sample 10.

Container 67 holds a supply of the previously mentioned diluting liquid (e.g. water) and pump 68 delivers the liquid at a known constant rate through a system of tubing and valve 70 (FIG. 2) into sample 10.

Pump 68, driven by a constant speed electric motor 72 (FIG. 2), may be of the well known precision dispensing roller type, one example of which is illustrated here. As such, the pump comprises plate 74 fixed to motor shaft 76. A number of radially disposed rollers 78 are spanned by a section of flexible tubing 80 which is wrapped, under tension, therearound so as to become collapsed progressively along a portion of its length by each of rollers 78 during rotation of plate 74. This forces the fluid to advance through tubing 80 in the direction of arrows 82 when plate 74 is rotated in the direction of arrow 84. Opposite ends of tubing 80 are held in block 86.

The diluting fluid is supplied to pump 68 through tubing 88 and the pump output is fed through tubing 90 to electrically operated solenoid valve 70. From valve 70, the output fluid is directed back into container 67 by tubing 92 for recirculation through pump 68 when valve 70 is in a first of two operating positions.

When valve 70 is in its second operating position, the pump output in tubing 90 is diverted through tubing 94 to delivery tube 36 at testing station 50.

Valve 70, in this case, is a conventional solenoid operated fluid switching device requiring no detailed description herein.

Electrical microswitch 64 which was said, hereinabove, to ready the electrical system of instrument 46 for the testing of sample 10 is also indicated in the circuitry illustrated in FIG. 7.

Figure 7:
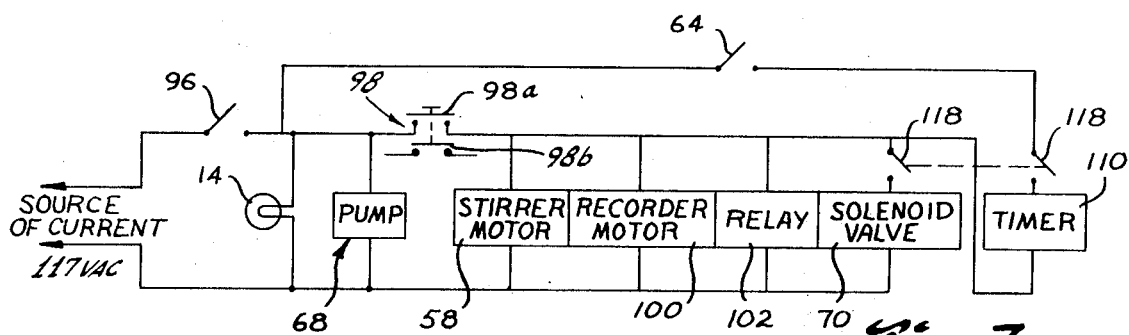
FIGS. 7 and 8 are schematic illustrations of exemplary electrical circuitry which may be applied to the illustrated apparatus embodiment of the invention for operation thereof.
Figure 8:
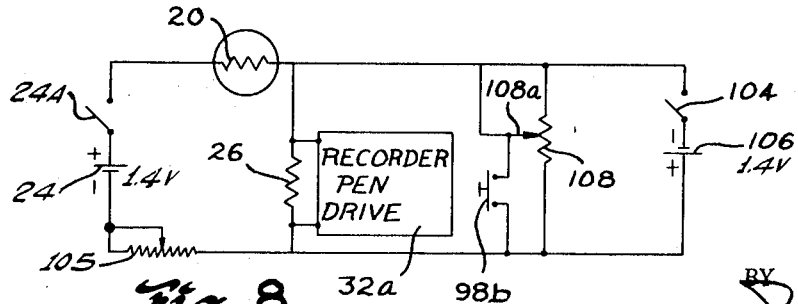

FIGS. 7 and 8 are schematic illustrations of electrical power and output circuits respectively which are applicable to instrument 46. The FIGS. 7 and 8 illustrations are, however, to be considered only as exemplary of many electrical systems which may be devised to perform similar functions either in less or more elaborate fashion.

With microswitch 64 closed by the positioning of test tube 12 in testing station 50, the instrument 46 is operated as follows:

Switch 96 is closed to energize lamp 14 and simultaneously start water pump 68. At this point, pump 68 circulates the diluting fluid back to container 67 through valve 70. At this time, switches 118 for controlling valve 70 and timer 110 are open. In not being electrically energized, valve 70 forms a communication between tubings 90 and 92.

Instrument 46 is next calibrated by closing normally open spring-biased switch 98 and which is common to both the power circuit (see FIG. 7, part 98a) and the instrument output circuit (see FIGS. 7 and 8, part 98b). Switch part 98a starts stirrer motor 58, motor 100 which drives paper 33 of recorder 28 and energizes relay 102 which closes both switches 24A and 104 in the output circuit of FIG. 8.

The closing of switches 24A and 104 causes battery cells 24 and 105 to energize the output circuit of FIG. 8. Output circuit includes photoresistor 20 and its variable resistor 105, recorder input resistor 26 and a variable resistor 108. (At this time, switches 118 will be opened.) Arm 108a of resistor 108 is mechanically operated by a conventional timer 110 (FIGS. 2, 3 and 7). The position of variable resistor 108 in instrument 46 is shown in FIG. 3. It is mechanically coupled to timer 110 so that its arm 108a (FIG. 8) is moved by drive shaft 112 of timer 110.

The function of variable resistor 108 is to modify the recorder pen input current across resistor 26 continuously with the time of sample dilution to compensate for changes in light transmitted through the sample as effected by the dilution thereof. This will be explained further.

Returning now to the stage where the circuit of FIG. 8 is battery energized, calibration of the instrument is accomplished by adjusting iris diaphragm 34 with knob 114 (FIGS. 2 and 3). Through gearing 116 (FIG. 3) the aperture of the optical projection system is adjusted in size to regulate the amount of light transmitted through sample 10 which, in turn, regulates the recorder input across resistor 26. Thus, pen 32 of recorder 28 may be adjusted to a desired starting position on recorder paper 30.

The test is initiated by simultaneously closing switches 118. This energizes solenoid valve 70 and timer 110.

With all components of the instrument now operating, and valve 70 diverting the diluting fluid through tubing 94 to dispensing tube 36 and into sample 10, the test is continued for a preselected period of time (e.g. nine minutes) to produce hemolysis curve 42.

Timer 110 may be utilized to return all switches to their initial open position at the end of the test run or to return the instrument to a condition of readiness for recalibration and the testing of another sample, whichever is desired.

The aforesaid switches may be operated manually in any desired sequence and accordingly, the latter operation of timer 110, being optional, will not be described in detail herein.

It is pointed out that the function of variable resistor 108 is to correct the hemolysis curve by electrically compensating for the gradual increase in light transmission resulting from progressive dilution of sample 10. Thus, the hemolysis curve reads percent hemolysis versus time (tonicity) independently of dilution. This correction may be eliminated from the system with the increase in light transmission due to dilution being considered and accounted for in a final analysis of the hemolysis curve.

All modifications and adaptations of the precise form of the invention here shown which may be made to suit particular requirements and which come within the scope of the following claims are intended to be covered.

What is claimed is:

1. A method for testing the osmotic fragility of organic cells comprising the steps of:
   preparing a test specimen solution by placing a quantity of said cells in an isotonic fluid suspension medium;
   directing light of a predetermined intensity into said specimen solution for transmission therethrough;
   delivering a fluid which is hypotonic with respect to said suspension medium directly into said specimen solution at a predetermined constant rate of flow over a given period of time; and
   monitoring variations in the amount of said light transmitted through said specimen solution during said period of time as an indication of the osmotic fragility of said organic cells.

2. The method according to claim 1 further including the step of:
   stirring said test specimen solution continuously during said step of delivering said hypotonic fluid thereinto.

3. The method according to claim 1 wherein said delivery of said hypotonic fluid into said specimen solution produces an osmotic gradient therein causing a release of cell protoplasm into said cell suspension medium and said method further includes the step of selectively filtering said light prior to transmittance thereof through said specimen solution to render said indication of cell osmotic fragility substantially unaffected by said release of protoplasm.

4. The method of claim 1 wherein said step of monitoring constitutes the step of photoelectric monitoring.

5. The method of claim 4 including electro-mechanically charting the electrical effects of said photoelectric monitoring as said indication of osmotic fragility.

6. Apparatus for testing the osmotic fragility of organic cells comprising:
   a transparent cuvette containing a test specimen solution consisting essentially of a quantity of said cells suspended in an isotonic fluid;
   a testing station having means for receiving and supporting the cuvette with said specimen solution disposed in a given position for testing;
   a fluid delivery tube at said station, said tube having a fluid emitting one end positioned within said specimen solution internally of the cuvette for directing a hypotonic diluting fluid directly into said isotonic fluid and organic cells specimen solution;
   means for continuously supplying said delivery tube with said diluting fluid at a predetermined constant rate over a preselected period of time;
   a stirrer arranged to enter into said test specimen solution along with said fluid dispensing tube wherewith a homogeneous condition is maintained throughout the specimen solution during said dispensing of the diluting fluid;
   means for projecting light into said specimen solution along a projection axis extending through said specimen testing position;
   photoelectric means for receiving light transmitted through said specimen solution along said projection axis; and
   means for monitoring the effect of said transmitted light upon said photoelectric means during said period of supplying said diluting fluid to said delivery tube wherewith indication of the osmotic fragility of said cells in said test specimen solution may be obtained.

7. The apparatus of claim 6 wherein said light projecting means comprises a light source, objective lens means and an adjustable diaphragm for regulating the amount of light projected into said sample.

8. The apparatus according to claim 7 wherein said light projecting means further includes a light filter.

9. The apparatus of claim 6 wherein said means for monitoring the effect of said transmitted light upon said photoelectric means comprises:
   an electrically energized electrical circuit in series connected relationship with said photoelectric means, said circuit including an electrical resistance, the electrical current across which is continuously modified according to the effect of said light upon said photoelectric means; and
   recording means receiving said modified electrical current for charting said modifications thereof.

References Cited

UNITED STATES PATENTS

| | | | |
|---|---|---|---|
| 1,954,925 | 4/1934 | Exton | 356—208X |
| 2,991,688 | 7/1961 | Schneider, Jr. | 250—218X |
| 3,300,385 | 1/1967 | Danon | 73—53X |
| 3,502,412 | 3/1970 | Burns | 356—40 |

RONALD L. WIBERT, Primary Examiner

W. A. SKLAR, Assistant Examiner

U.S. Cl. X.R.

73—53; 250—218; 356—40, 208